US008660296B1

(12) United States Patent
Ioffe

(10) Patent No.: US 8,660,296 B1
(45) Date of Patent: Feb. 25, 2014

(54) SYSTEMS AND METHODS FOR FACILITATING VIDEO FINGERPRINTING USING LOCAL DESCRIPTORS

(75) Inventor: Sergey Ioffe, Mountain View, CA (US)

(73) Assignee: Google Inc., Mountain View, CA (US)

(*) Notice: Subject to any disclaimer, the term of this patent is extended or adjusted under 35 U.S.C. 154(b) by 214 days.

(21) Appl. No.: 13/347,680

(22) Filed: Jan. 10, 2012

(51) Int. Cl.
*G06K 9/00* (2006.01)
(52) U.S. Cl.
USPC .......................................................... 382/100
(58) Field of Classification Search
USPC ........... 382/100, 232–253, 283; 380/200–242
See application file for complete search history.

(56) References Cited

U.S. PATENT DOCUMENTS

| | | | | |
|---|---|---|---|---|
| 6,226,387 | B1 * | 5/2001 | Tewfik et al. | 382/100 |
| 7,702,127 | B2 * | 4/2010 | Mihcak et al. | 382/100 |
| 8,094,872 | B1 * | 1/2012 | Yagnik et al. | 382/100 |
| 8,175,413 | B1 * | 5/2012 | Ioffe et al. | 382/283 |
| 8,452,106 | B2 * | 5/2013 | Ke et al. | 382/195 |
| 8,494,234 | B1 * | 7/2013 | Bozinovic et al. | 382/124 |
| 2011/0080958 | A1 * | 4/2011 | Srpljan et al. | 375/240.25 |

OTHER PUBLICATIONS

Mikolajczyk, Krystian, and Cordelia Schmid. "A performance evaluation of local descriptors." Pattern Analysis and Machine Intelligence, IEEE Transactions on 27.10 (2005): 1615-1630.*
Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.
Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.
Broder et al., "Min-wise independent permutations," J. Comput. Syst. Sci., vol. 60, No. 3, pp. 630-659, 2000.

(Continued)

*Primary Examiner* — Shefali Goradia
(74) *Attorney, Agent, or Firm* — Turocy & Watson, LLP

(57) ABSTRACT

Systems and methods for facilitating video fingerprinting are provided. In one embodiment, a system can include: a memory, a microprocessor, a communication component that receives a video, and a video fingerprinting component that fingerprints the video with a subfingerprint (SFP). The video fingerprinting component can employ an SFP component stored in the memory and that comprises: a feature extraction component that determines local descriptors for at least one frame of a video; and a quantization component that quantizes the local descriptors to generate first frame information including a set of values for the at least one frame. The SFP component can also include: an accumulation component that accumulates first frame information over a snippet of the video; and an SFP generation component that computes the SFP associated with the snippet. The SFP can be computed based on a hash based on the accumulated first frame information over the snippet.

32 Claims, 13 Drawing Sheets

(56) References Cited

OTHER PUBLICATIONS

Ioffe, "Improved Consistent Sampling, Weighted Minhash and L1 Sketching," IEEE ICDM, 2010.

Massoudi et al. "A Video Fingerprint Based on Visual Digest and Local Fingerprints", IEEE International Conference on Image Processing, 2006; Date of Conference: Oct. 8-11, 2006.

Chao, "The Core of Video Fingerprinting: Examples of Feature Extraction", http://disp.ee.ntu.edu.tw/~pujols/The%20Core%20of%20Video%20Fingerprinting.pdf.

Baudry et al., "A Framework for Video Forensics Based on Local and Temporal Fingerprints", 2009 16th IEEE International Conference on Image Processing (ICIP), Date of Conference: Nov. 7-10, 2009.

Sarker et al., "Video Fingerprinting: Features for Duplicate and Similar Video Detection and Query-based Video Retrieval", http://www.emilymoxley.com/papers/sarkar_SPIE08_fingerprinting.pdf.

Chum et al., "Near Duplicate Image Detection: min-Hash and tf-idf Weighting", 2008, http://www.comp.leeds.ac.uk/bmvc2008/proceedings/papers/119.pdf.

P2P File Sharing, "Altnet Launches Global File Registry" Aug. 3, 2011, http://www.p2p-weblog.com/50226711/altnet_launches_global_file_registry.php.

* cited by examiner

SYSTEMS AND METHODS FOR FACILITATING VIDEO FINGERPRINTING USING LOCAL DESCRIPTORS

TECHNICAL FIELD

This disclosure generally relates to video fingerprinting using local descriptors.

BACKGROUND

Conventional video processing methods employ video fingerprinting to identify near-duplicate videos, and/or portions thereof. Video fingerprinting can be also employed in identifying copyrighted material in a video. Unfortunately, methods for generating fingerprints are typically complex. Further, the fingerprints generated can be sensitive to crops, scaling and/or flipped versions of the video, rendering the generated fingerprint of limited utility. As such, systems and methods that provide new approaches for generating video fingerprints are desired.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

In one or more embodiments, the disclosed subject matter relates to a system that performs video fingerprinting, comprising: a memory that stores computer executable components; and a microprocessor that executes computer executable components stored in the memory. The computer executable components can include: a video fingerprinting component that generates a subfingerprint of a video. The video fingerprinting component can include: a feature extraction component that determines one or more local descriptors for one or more selected frames of the video; and a quantization component that quantizes the one or more local descriptors to generate first frame information. The first frame information can include a set of values for the one or more selected frames of the video. The video fingerprinting component can also include an accumulation component that accumulates the first frame information over a snippet of the video. The snippet can include selected consecutive ones of the frames of the video. The video fingerprinting component can also include a subfingerprint generation component that computes the subfingerprint associated with the snippet. Computing the subfingerprint can include computing a first hash based on an accumulated first frame information over the snippet.

In one or more embodiments, the disclosed subject matter relates to a method facilitating video fingerprinting. The method can include: generating a first set of one or more local descriptors for at least one frame of a video; generating a second set of one or more local descriptors for a flipped version of the at least one frame of the video; and quantizing the local descriptors of the first set and the second set to generate quantized local descriptors. The method can also include appending, to each quantized local descriptor, an identifier of a part of the snippet of the video in which the quantized local descriptor is located to generate a set of augmented quantized local descriptors; generating a histogram representing the set of augmented quantized local descriptors; and computing a subfingerprint for the video based at least on computing one or more hash values for the histogram.

In one or more embodiments, the disclosed subject matter relates to another method for generating a subfingerprint of a snippet of a video, wherein the snippet includes sets of frames. The method can include: generating one or more local descriptors for each set of frames; quantizing each local descriptor to yield quantized local descriptors; appending, to each quantized local descriptor, an identifier of a part of the snippet in which the quantized local descriptor is located to yield a set of augmented quantized local descriptors; computing a count of augmented quantized local descriptors to yield a weighted set of augmented quantized local descriptors; and computing a hash for the weighted set of augmented quantized local descriptors.

In one or more embodiments, the disclosed subject matter relates to another method facilitating video fingerprinting. The method can include: determining one or more local descriptors for at least one frame of a video; and quantizing the one or more local descriptors to generate first frame information. The first frame information can include a set of values for the at least one frame. The method can also include accumulating additional first frame information over a snippet of the video. The snippet can include the at least one frame and one or more additional frames of the video within a fixed duration of time. The method can also include computing an SFP associated with the snippet. The computing the SFP can include computing a first hash based on an accumulated first frame information over the snippet.

Toward the accomplishment of the foregoing and related ends, the one or more embodiments include the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
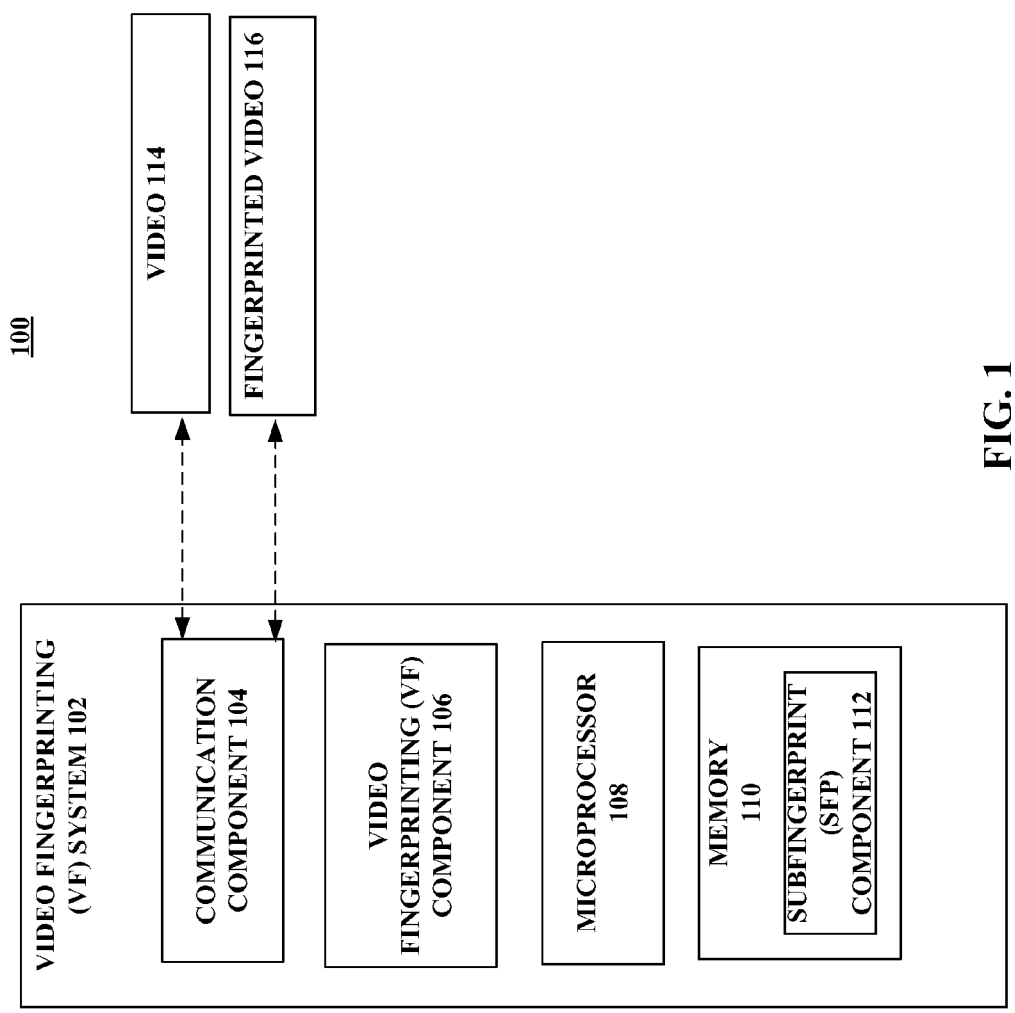
FIG. 1 is an illustration of a block diagram of an exemplary non-limiting system that facilitates video fingerprinting using local descriptors in accordance with this disclosure.

Various embodiments are now described with reference to the drawings, wherein like reference numerals are used to refer to like elements throughout. In the following description, for purposes of explanation, numerous specific details are set forth in order to provide a more thorough understanding of one or more embodiments. It is be evident, however, that such embodiments can be practiced without these specific details. In other instances, structures and devices are shown in block diagram form in order to facilitate describing one or more embodiments.

Systems and methods disclosed herein relate to video fingerprinting using local descriptors. In particular, a system can include a subfingerprint (SFP) component that can generate an SFP for a video received and/or processed by the system. In various embodiments, the SFP can be an identifier or signature (e.g., a string of bits) that describes content of video (or snippets thereof). The SFP component can include a feature extraction component that can determine one or more local descriptors for one or more frames of the video and a quantization component that can quantize the local descriptors. In some embodiments, the local descriptors can be determined for one or more frames (in lieu of determining the local descriptors for averages of the frames). The system can also include an accumulation component that can accumulate frame information over consecutive frames (e.g., a snippet) of the video. An identifier can be appended to the portion of the snippet in which the quantized local descriptors is located, and a count of the local descriptors over the snippet can be computed. A histogram can then be generated of a weighted set of local descriptors. An SFP generation component can then compute the SFP based on a hash.

The systems and methods can advantageously facilitate the use of video fingerprinting in cases in which the video is cropped, scaled and/or flipped horizontally or vertically. In various embodiments, the systems and methods can be utilized in a video deduping pipeline and/or can be utilized to identify duplicate videos during video searching or matching. Further, the systems and methods herein can be utilized for horizontal flipped versions or vertical flipped versions of the video, rendering the systems and methods robust to such flips.

FIG. 1 is an illustration of a block diagram of an exemplary non-limiting system that facilitates video fingerprinting using local descriptors. The system (e.g., system 100) can include a video fingerprinting (VF) system 102 that can include a communication component 104, a VF component 106, a microprocessor 108 and/or a memory 110. In some embodiments, system 100 can also include video 114 and/or fingerprinted video 116. The communication component 104, VF component 106, microprocessor 108 and/or memory 110 can be electrically and/or communicatively coupled to one another to perform one or more functions of the system 100 described in this disclosure.

The communication component 104 can receive a video 114, or component thereof. The communication component 104 can also output a fingerprinted video 116, as shown in FIG. 1. The fingerprinted video 116 can include a subfingerprint (SFP). In some embodiments, the communication component 104 can also output an SFP for the received video 114. In various embodiments, the communication component 104 can access a video stored at the memory 110 of the VF system 102 and/or stored at a location remote from the VF system 102. For example, the communication component 104 can access the video 114 over a network (not shown) including, but not limited to, the internet.

The VF component 106 can fingerprint the video with an SFP. In various embodiments, for example, the VF component 106 can employ the SFP component 112 stored in the memory 110 to generate the SFP with which the video (or a portion thereof) is fingerprinted.

Microprocessor 108 can perform one or more of the functions described in this disclosure with reference to any of the systems and/or methods disclosed.

The memory 110 can be a computer-readable storage medium storing computer-executable instructions and/or information for performing the functions described in this disclosure with reference to any of the systems and/or methods disclosed. For example, as shown, memory 110 can store computer-executable instructions in some embodiments, for performing the functions of the SFP component 112.

Figure 2:
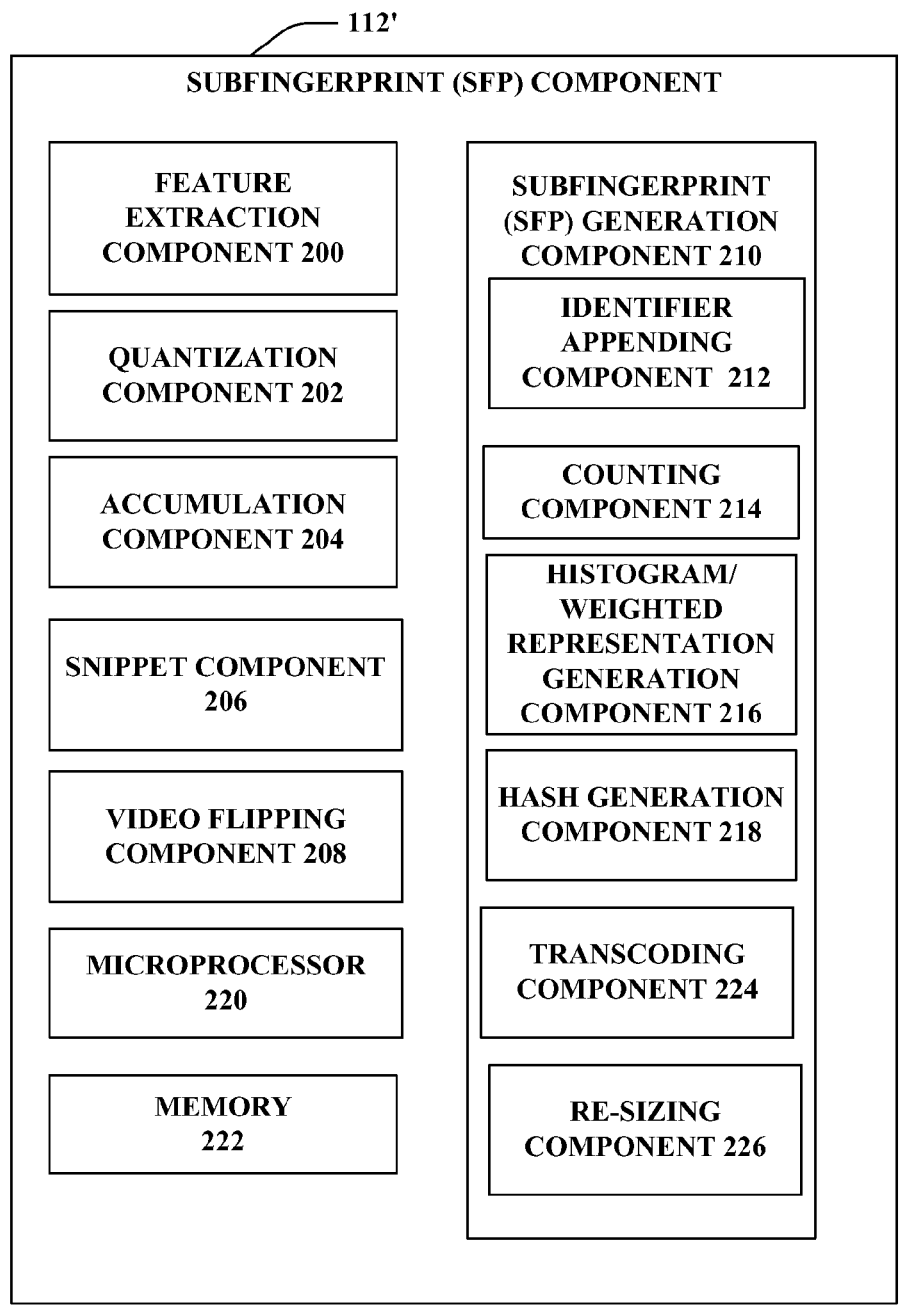
FIG. 2 is an illustration of a block diagram of an exemplary non-limiting system that facilitates video fingerprinting using local descriptors in accordance with this disclosure.

FIG. 2 is an illustration of a block diagram of an exemplary non-limiting system (SFP 112') that can facilitate video fingerprinting using local descriptors. One or more of the structure and/or functions of the SFP component 112 of FIG. 1 can be as described and/or shown with reference to the SFP component 112' of FIG. 2.

As shown in FIG. 2, the SFP component 112' can include a feature extraction component 200, a quantization component 202, an accumulation component 204, a snippet component 206 and/or an SFP generation component 210. In some embodiments, the SFP generation component 210 can include an identifier appending component 212, a counting component 214, a histogram/weighted representation generation component 216, a hash generation component 218, a transcoding component 224 and/or a re-sizing component 226. SFP component 112' can also include a video flipping component 208 in various embodiments. In various embodiments, one or more of the feature extraction component 200, quantization component 202, accumulation component 204, snippet component 206, video flipping component 208, SFP generation component 210, identifier appending component 212, counting component 214, histogram/weighted representation generation component 216, hash generation component 218, transcoding component 224 and/or re-sizing component 226 can be electrically and/or communicatively coupled to perform one or more functions of the SFP component 112' (or SFP component 112).

The feature extraction component 200 can determine one or more local descriptors for one or more frames of a video. In various embodiments, the local descriptors can be determined for an average of two or more frames. The frames can be selected (or averages of the frames can be determined) prior to generating the local descriptors. As such, the frames (or averages thereof) can be separated by one or more other frames, or be of various durations of time, in some embodiments.

The local descriptors for one or more frames (or averages of two or more frames) can be based on the content of one or more frames. The local descriptors can include, but are not limited to, information indicative of a type, position, scale or aspect ratio of the frame (or average of two or more frames). In various embodiments, the local descriptor can include information indicative of a descriptor of a portion of the frame (or average of two or more frames). In some embodiments, the local descriptor can include a scale invariant feature transform (SIFT) descriptor, a Speeded Up Robust Feature (SURF) descriptor, a CONGAS descriptor, or another variant of descriptor. SIFT is an algorithm in computer vision to detect and describe local features in images. SURF is an image detector and descriptor that can be used for computer vision tasks like object recognition. CONGAS is a local descriptor based on Gabor wavelets of varying scale and orientation drawn from a space variant grid around an interest point.

The quantization component 202 can quantize the one or more local descriptors, and generate frame information that is based on the quantized local descriptors. In some embodiments, the frame information can include a weighted set of values for the selected frames (or for the average of the selected frames). The values can be weighted based on the number of occurrences of the local descriptors, for example.

The accumulation component 204 can accumulate, over a snippet of the video, the frame information based on the quantized local descriptors. The snippet can include selected consecutive frames of the video within a fixed duration of time.

The SFP generation component 210 can compute the SFP associated with the snippet. In various embodiments, the SFP generation component 210 can compute the SFP by computing a hash that is based on the accumulated frame information over the snippet.

In some embodiments, the SFP can be computed as follows. The identifier appending component 212 of the SFP generation component 210 can append an identifier to the quantized local descriptors to describe a part of a snippet in which the local descriptors occur. Augmented quantized local descriptors can be generated as a result.

The counting component 214 can then compute a count of the augmented quantized local descriptors over the snippet. The histogram/weighted representation generation component 216 can generate a histogram including a weighted set of the augmented quantized local descriptors. The hash generation component 218 can compute one or more hash values for the histogram. The SFP generation component 210 can compute the SFP based on the one or more hash values. In various embodiments, an SFP can be an identifier or signature (e.g., a string of bits) that describes content of video (or snippets thereof).

Accordingly, SFPs can be computed for snippets of videos. As such, near-duplicates of cropped and/or scaled versions of videos can be identified in various embodiments.

The transcoding component 224 can perform encoding and/or decoding of media. In some embodiments, the transcoding component 224 can transcode media by converting encoded information in a first format to encoded information in a second format. In various embodiments, the transcoding component 224 can be, or can be included in, the transcoder 1070 described with reference to FIG. 10.

The re-sizing component 226 can re-size the frames to a selected number of pixels. For example, in various embodiments, the re-sizing component 226 can re-size the frame while preserving the aspect ratio.

In various embodiments, the SFP component 112' can include a video flipping component that can flip a received video. One or more of the functions of the VF system 102, SFP component 112 (or SFP component 112') can be performed for the flipped version of the video. For example, the local descriptors (and quantized versions thereof) can be determined not only for the original video but also for the above-described flipped versions. For example, the quantized local descriptors can be computed for a frame (or for an average of two or more frames) for the original video, and quantized local descriptors can be similarly determined for the corresponding frame (or average of corresponding two or more frames) for the flipped version of the video.

The quantized local descriptors for the flipped version of the video and for the original (e.g., non-flipped) version of the video can be combined to create a new set of quantized local descriptors. Weights can be generated for the entire set of quantized local descriptors. As described above with reference to FIG. 2, frame information can be accumulated (based on the new set of quantized local descriptors) over a snippet of the video. Finally, an SFP can be computed employing on a hash computed based on the accumulated frame information over the snippet as described with reference to FIG. 2. As such, because the frame information incorporates information for the non-flipped and flipped versions of a video, the SFP can be invariant to such flips. Accordingly, the systems and methods herein can be robust notwithstanding a video being processed may be a flipped version of the original video (or flipped version of a portion of the video). Accordingly, near-duplicates of flipped versions of videos can be identified in various embodiments.

Figure 3:
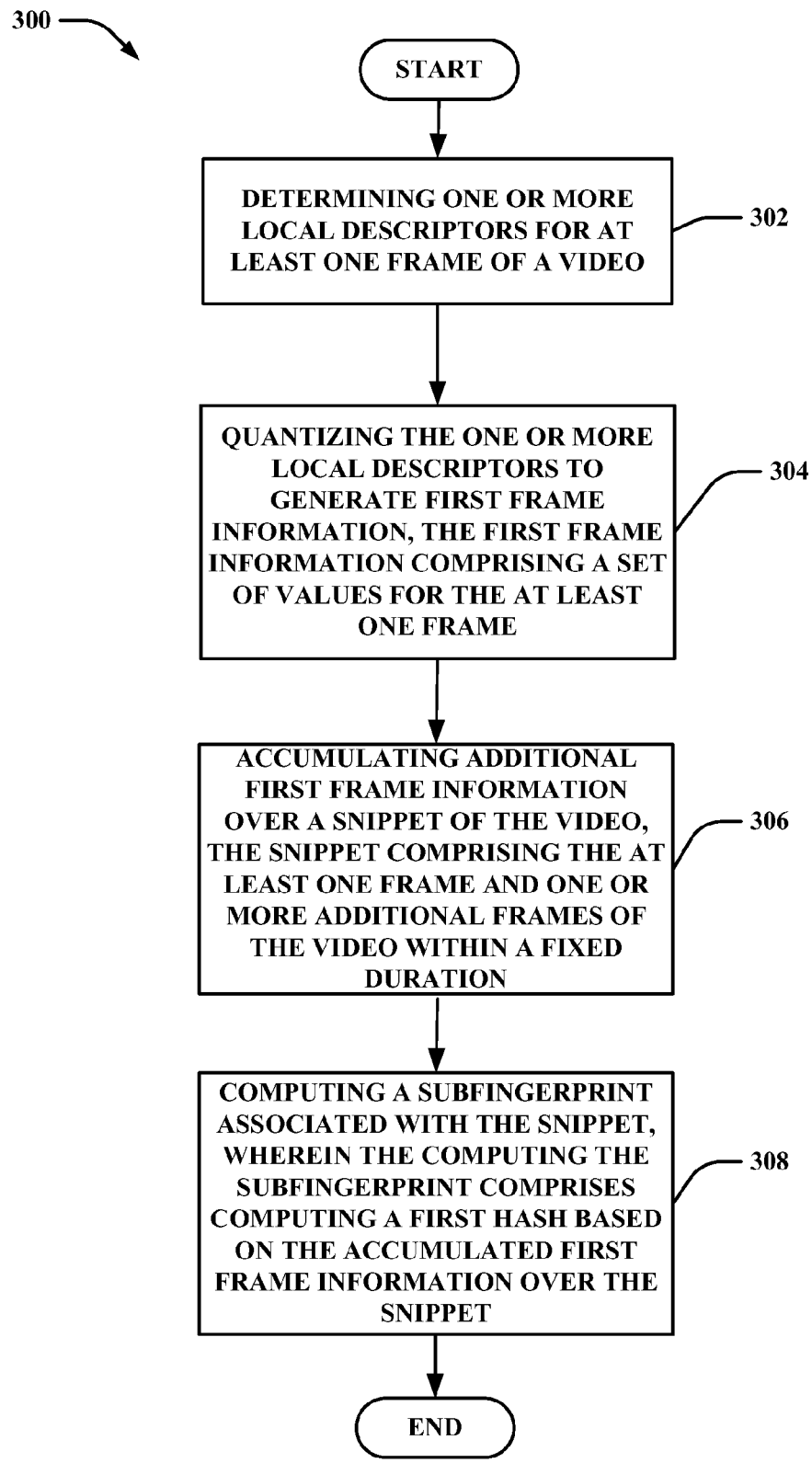
FIGS. 3, 4, 5A, 5B, 6, 7A, 7B, 7C and 8 are illustrations of exemplary flow diagrams of methods that facilitate video fingerprinting using local descriptors in accordance with this disclosure.

FIGS. 3, 4, 5A, 5B, 6, 7A, 7B, 7C and 8 are illustrations of exemplary flow diagrams of methods that facilitate video fingerprinting using local descriptors. Turning first to FIG. 3, at 302, method 300 can include determining one or more local descriptors for at least one frame of a video (e.g., using the feature extraction component 200).

In some embodiments, the local descriptors can include information associated with a type, position, scale, aspect ratio and/or a descriptor of a portion of the frame (or for an average of two or more frames). In some embodiments, the local descriptors include a SIFT descriptor, a SURF descriptor and/or a CONGAS descriptor.

While not shown, in some embodiments, method 300 can include removing selected content from the frames (or averages thereof) prior to determining the local descriptors. The selected content can include, but is not limited to, a border in the video frame or a logo (e.g., station logo) in the one or more video frames (or in the frames averaged). Four example, the border can be a black (or other color) border of a video frame.

At 304, method 300 can include quantizing the local descriptors to generate frame information (e.g., using the quantization component 202). The frame information can include a set of values for the at least one frame.

In some embodiments, the quantization can be tree-based quantization of the local descriptors. By way of example, but not limitation, the tree-based quantization can be a hierarchical k-means quantization. In some embodiments, quantizing can include mapping the local descriptors to one or more closest neighbors from a selected set of neighbors.

At 306, method 300 can include accumulating additional frame information over a snippet of the video (e.g., using the accumulation component 204). The snippet can include the at least one frame of the video and one or more additional frames of the video within a fixed duration. While not shown, the method can include identifying a snippet of video (e.g., using the snippet component 206).

At 308, method 300 can include computing an SFP associated with the snippet (e.g., using the SFP generation component 210). Computing the SFP can include computing a hash. The hash can be based on the accumulated frame information over the snippet.

In some embodiments, while not shown, method 300 can also include computing SPFs for one or more snippets of the video (e.g., using the SFP generation component 210). The snippets can be separated a predefined amount of time apart from one another in some embodiments. In some embodiments, the SFPs can be generated for snippets spaced apart from one another.

In various embodiments, while not shown, a method for generating a fingerprint that is invariant to a flipped version of the video can be as follows. A flipped version of the video can be generated or obtained (e.g., using the video flipping component 208). By way of example, but not limitation, the method can include determining a first set and a second set of local descriptors (e.g., using the feature extraction component 200). The first set can be associated with one or more selected frames of the video and the second set can be associated with one or more selected frames of the flipped version of the video. The one or more selected frames of the flipped version of the video can correspond to the one or more selected frames of the video. The method can also include quantizing the first set and the second set of the local descriptors to generate frame information (e.g., using the quantizing component 202). The first frame information can include a weighted set of values for the one or more selected frames of the video and for the one or more selected frames of the flipped version of the video. The method can also include accumulating the frame information over a snippet of the video (e.g., using the accumulation component 204). The snippet can include selected consecutive ones of the frames of the video. The method can also include computing the SFP associated with the snippet (e.g., using the subfingerprint generation component 210). Computing the subfingerprint can include computing a first hash based on accumulated frame information over the snippet (e.g., using the hash generation component 218).

Figure 4:
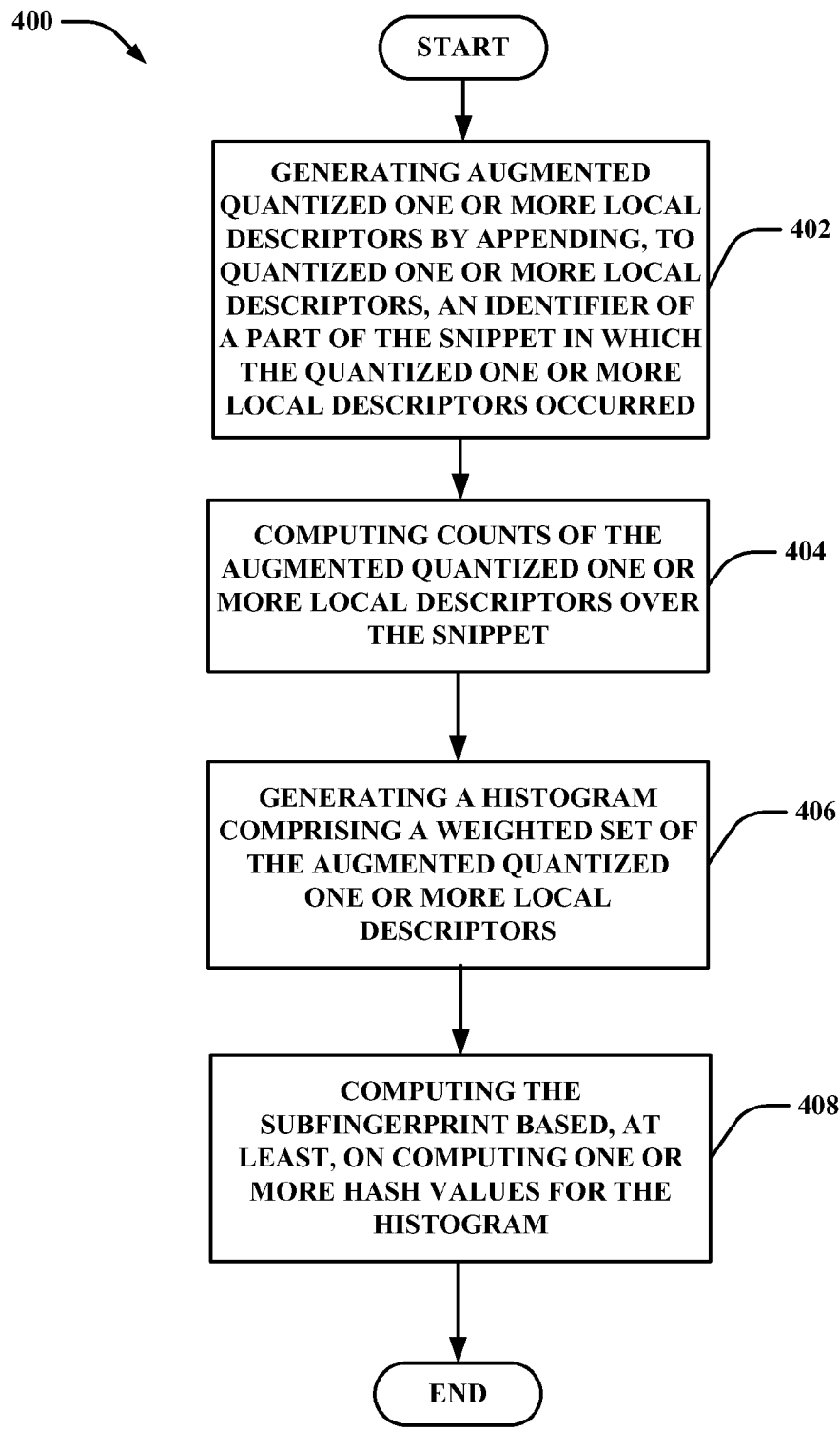

Turning now to FIG. 4, method 400 can be a method for computing an SFP. At 402, method 400 can include generating augmented quantized local descriptors by appending, to quantized local descriptors, an identifier of a part of the snippet in which the quantized local descriptors occurred (e.g., using the identifier appending component 212).

At 404, method 400 can include computing counts of the augmented quantized local descriptors over the snippet (e.g., using the counting component 214).

At 406, method 400 can include generating a histogram utilizing the weighted set of augmented quantized local descriptors (e.g., using the histogram/weighted representation generation component 216).

At 408, method 400 can include computing the SFP based, at least, on computing one or more hash values for the histogram (e.g., using the SFP generation component 210). The hash values can be computed by the hash generation component 218 in some embodiments.

Figure 5A:
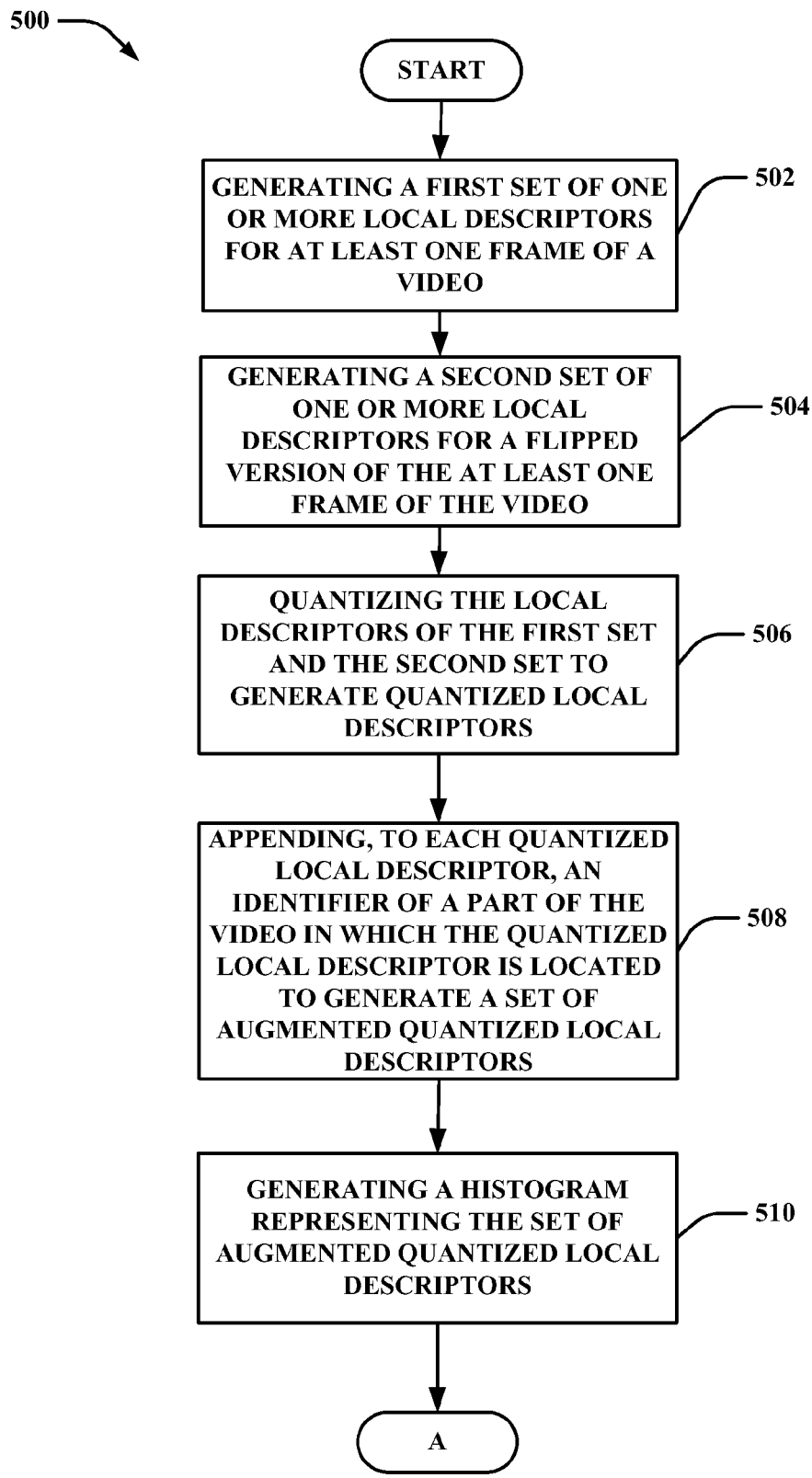
Figure 5B:
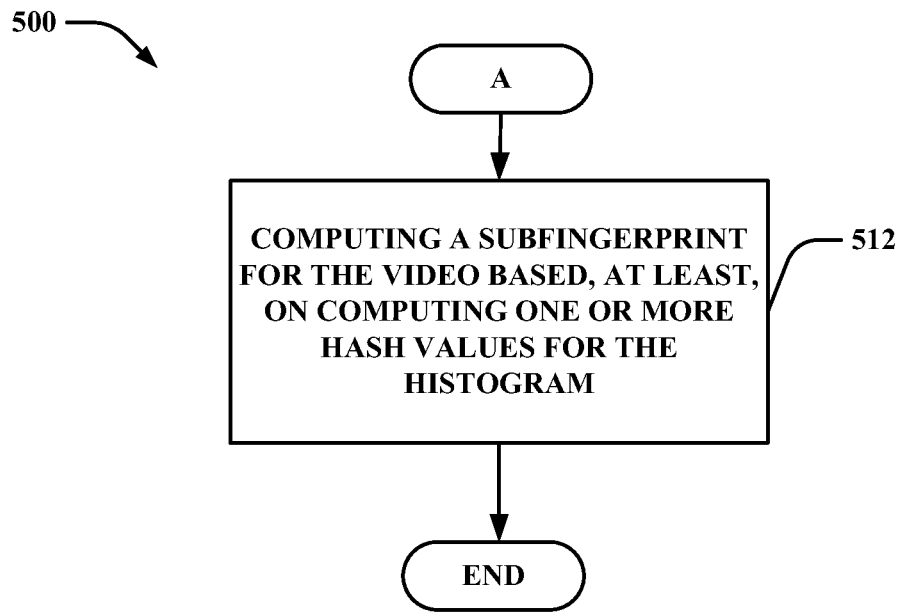

Turning now to FIGS. 5A and 5B, method 500 can be a method for computing an SFP that is robust to flipped versions of video. As shown in FIG. 5A, at 502, method 500 can include generating a first set of one or more local descriptors for at least one frame of a video (e.g., using the feature extraction component 200). At 504, method 500 can include generating a second set of one or more local descriptors for a flipped version of the at least one frame of the video (e.g., using the feature extraction component 200).

At 506, method 500 can include quantizing the local descriptors of the first set and the second set to generate quantized local descriptors (e.g., using the quantization component 202).

At 508, method 500 can include appending, to each quantized local descriptor, an identifier of a part of a snippet in which the quantized local descriptor is located to generate a set of augmented quantized local descriptors (e.g., using the identifier appending component 212).

At 510, method 500 can include generating a histogram representing the set of augmented quantized local descriptors (e.g., using the histogram/weighted representation generation component 216).

Turning now to FIG. 5B, method 500 can include computing an SFP for the video based at least on computing one or more hash values for the histogram (e.g., using the SFP generation component 210).

Figure 6:
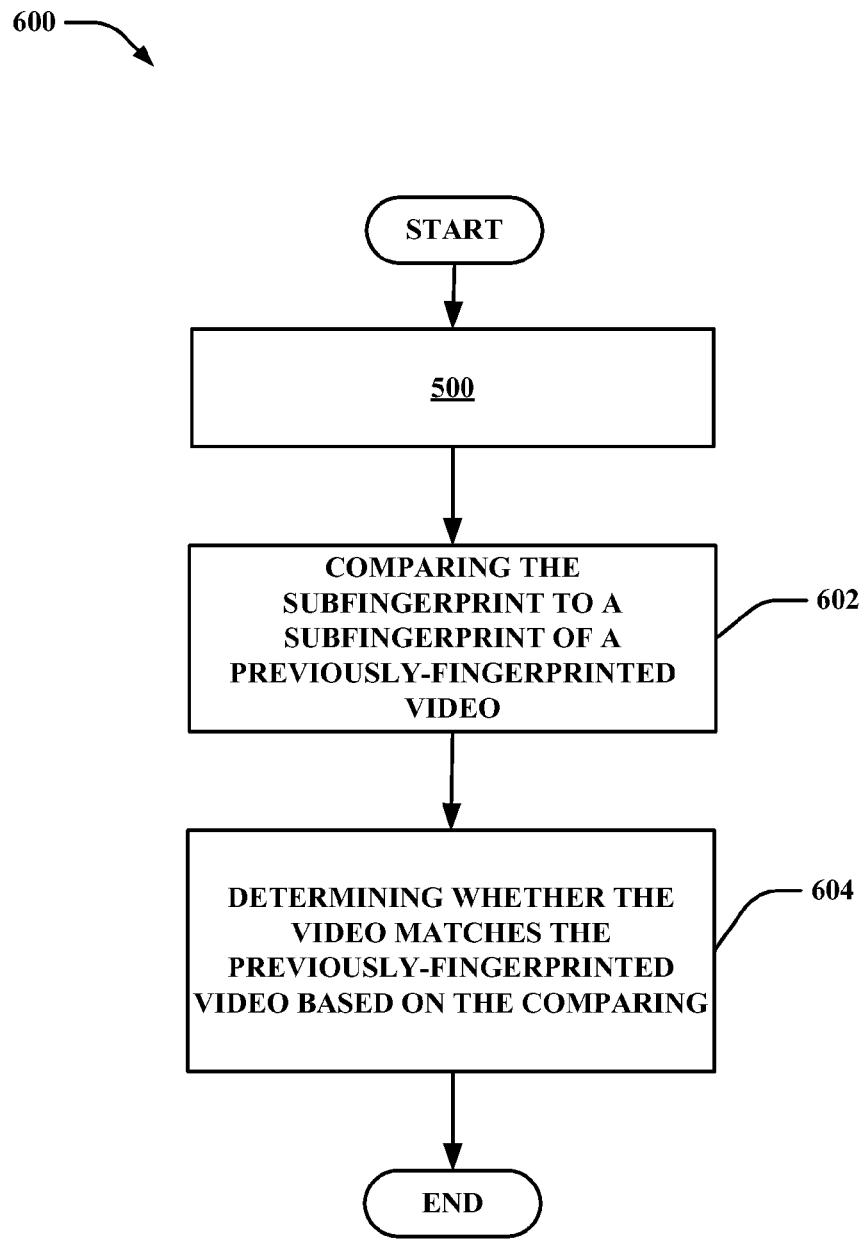

Turning now to FIG. 6, method 600 is an illustration of an exemplary method for comparing fingerprinted videos. Method 600 can include the actions of method 500 for generating one or more SFPs for a video. At 602, method 600 can include comparing the SFP generated for the video to an SFP for a previously-fingerprinted video (e.g., using the VF component 106). At 604, method 600 can include determining whether the video matches the previously-fingerprinted video based on the comparison (e.g., using the VF component 106). In various embodiments, cropped, scaled and/or flipped versions of videos can be compared.

In some embodiments, a method of performing video fingerprinting can be as follows. For one or more frames of a video, a set of local descriptors can be computed. In some embodiments, the local descriptors are computed for each of the frames of the video (e.g., using the feature extraction component 200). The local descriptors can be SURF, SIFT and/or CONGAS local descriptors and/or any of a number of other variants of video descriptors.

The local descriptors for the frames can then be quantized (e.g., using the quantization component 202), yielding a representation of each frame. The representation can be a set of information (e.g., words) that describes the frame. In some embodiments, the sets of information can be accumulated over a sliding (temporal) window of frames (e.g., using the accumulation component 204), yielding a larger set of descriptors for a video snippet of a fixed duration. This larger set of descriptors can be weighted (e.g., using the histogram/weighted representation generation component 216).

A hash can then be computed from this larger set of descriptors (e.g., using the hash generation component 218). In one embodiment, the SFP for the snippet is the hash. In other embodiments, the hash is employed to generate the SFP for the snippet. SFPs can be generated for one or more of video snippets of a selected length and separated a selected amount of time apart.

Figure 7A:
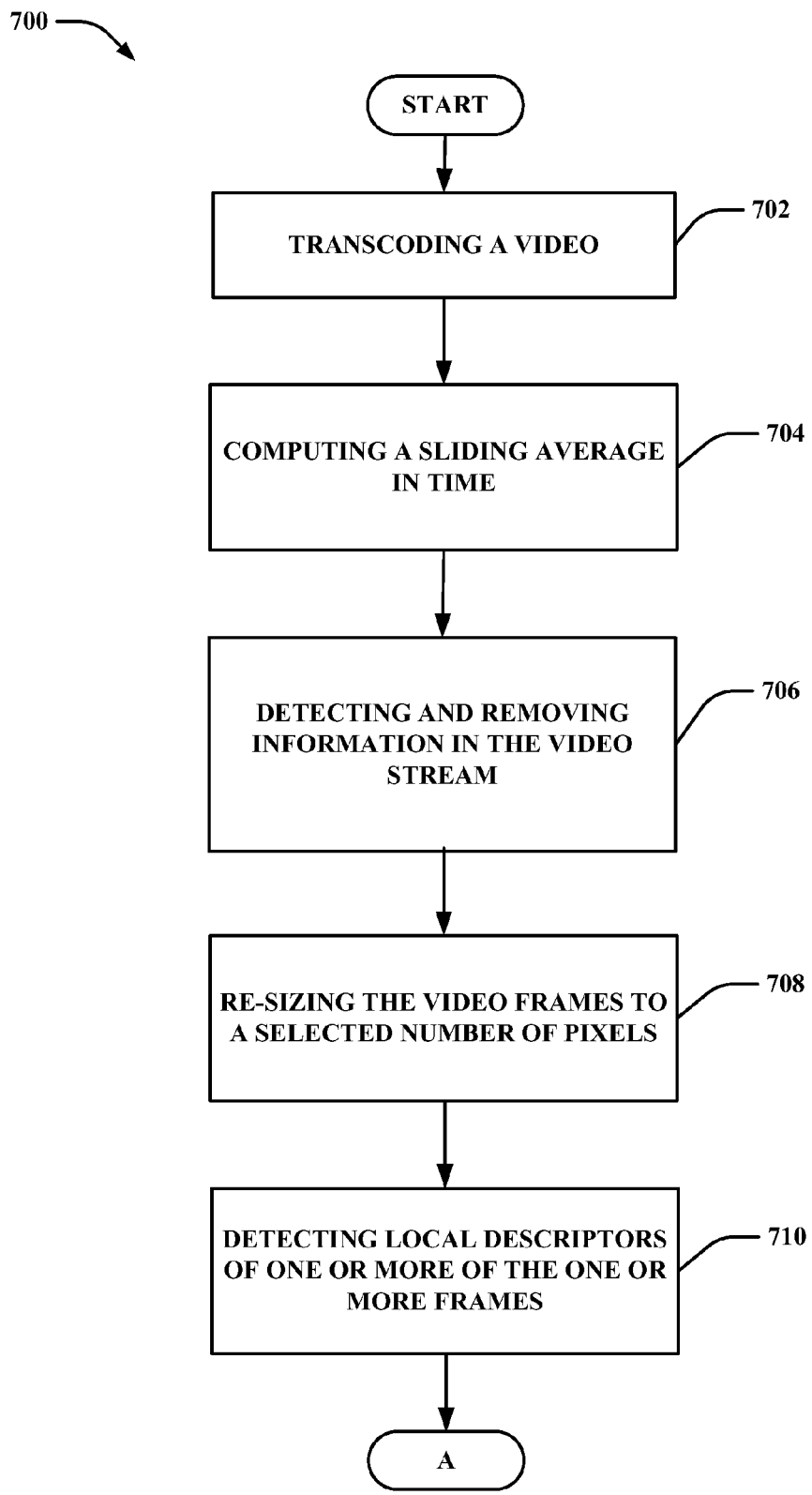
Figure 7B:
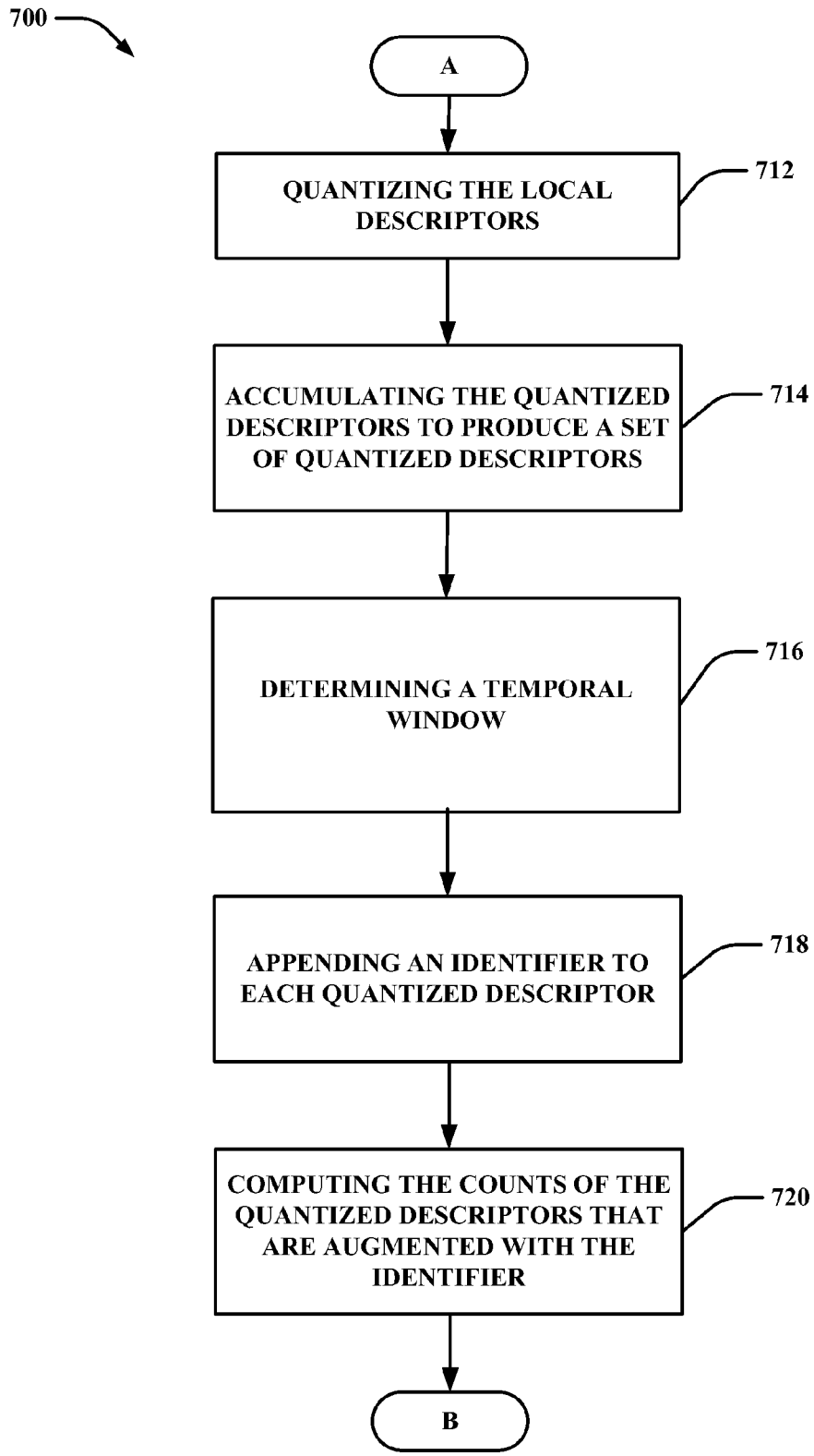
Figure 7C:
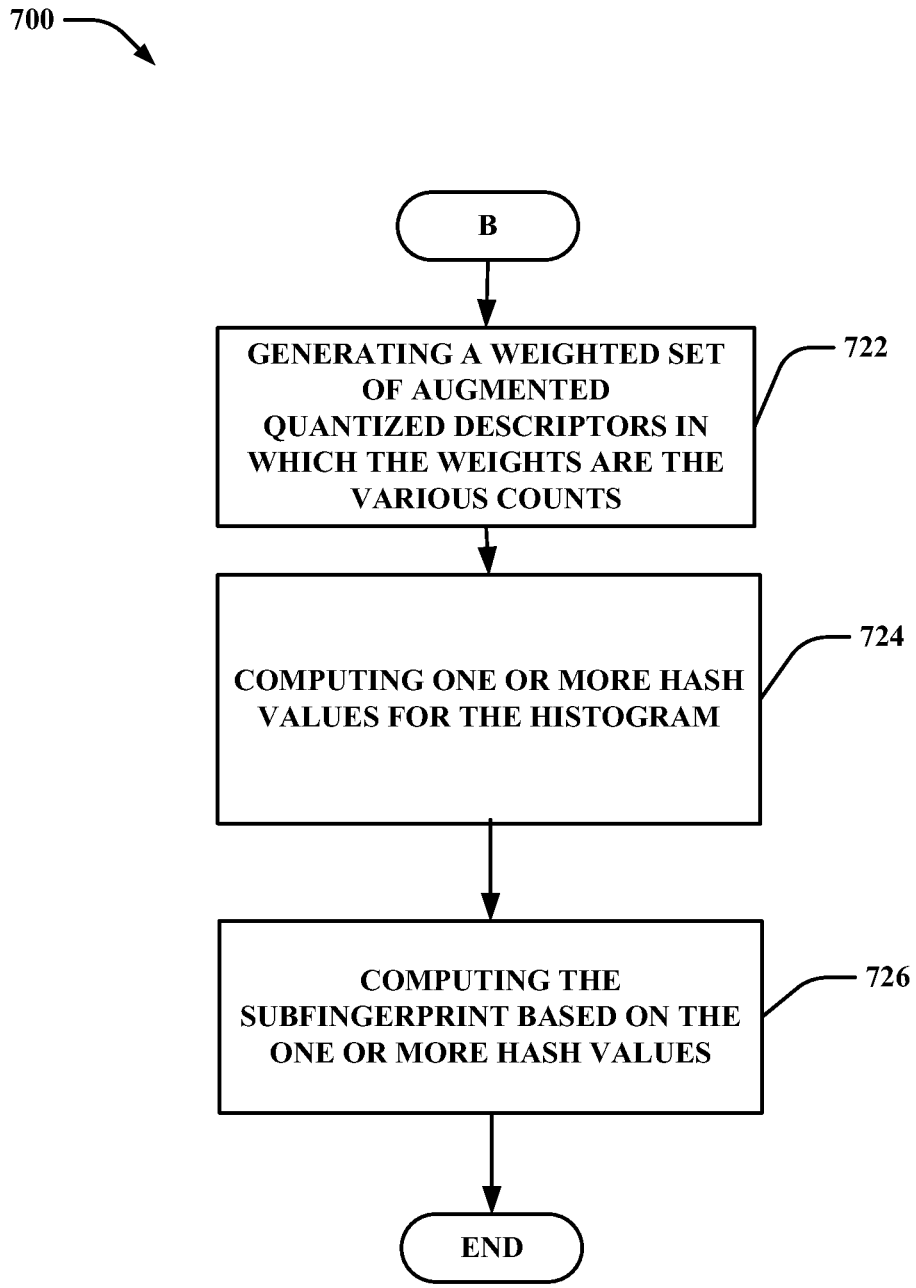

FIGS. 7A, 7B and 7C are exemplary flow diagrams of a method that facilitates video fingerprinting using local descriptors. Turning first to FIG. 7A, at 702, method 700 can include transcoding a video (e.g., using the transcoding component 224 or the transcoder 1070). At 704, method 700 can include computing a sliding average in time (e.g., using the accumulation component 204). In some embodiment, the sliding average can be computed by convolving the video with a temporal filter. In some embodiments, for example, the convolution can produce a video stream at 8 frames per second (fps) where each frame can represent an average of 0.75 sec of the original video, sampled at 8 hertz (Hz).

At 706, method 700 can include detecting and removing information in the video stream (e.g., using the feature extraction component 200). In various embodiments, borders (e.g., black borders) and/or logo information (e.g., station logo information) can be detected and removed.

At 708, method 700 can include re-sizing the video frames to a selected number of pixels (e.g., using the re-sizing component 226. The re-sizing can preserve the aspect ratio in some embodiments.

At 710, method 700 can include detecting local descriptors (e.g., CONGAS) of one or more of the averaged frames (e.g., using the feature extraction component 200). In one implementation, the number of features detected per frame is capped at 25. One or more of the features can include information such as a type, position, scale, aspect ratio and/or a descriptor of a local part of the frame (as for example responses to Gabor filters).

Turning now to FIG. 7B, at 712, method 700 can include quantizing the local descriptors (e.g., using the quantization component 202). In some embodiments, the position descriptor can be quantized using one or more grids. In some embodiments, the scale descriptor (or, in some embodiments, the log(scale) descriptor) and/or the aspect ratio descriptor can be quantized using separate grids. In one implementation, each descriptor is quantized using, for example, a tree-based quantization (e.g., hierarchical k-means quantization). In one embodiment, each descriptor is mapped to a set of six (approximate) closest neighbors out of a set of 100,000 neighbors.

At 714, method 700 can include accumulating the quantized descriptors to produce a set of quantized descriptors (e.g., using the accumulation component 204). For example, in a set, each quantized descriptor can be a tuple including, but not limited to, type, quantized position, quantized scale, and/or quantized descriptor). In one implementation, two separate grids are utilized to quantize the position descriptor, and the six closest neighbors are determined in order to quantize the descriptor. As such, in this embodiment, 12 quantized descriptors can be generated for each original descriptor.

At 716, method 700 can include determining a temporal window (e.g., using the snippet component 206). For example, in some embodiments, windows having a length of three seconds can be divided into one or more portions. The one or more portions can be overlapping or non-overlapping in various embodiments. For example, if two of the portions are non-overlapping, the portions can be two disjoint portions.

At 718, method 700 can include appending an identifier to each quantized descriptor (e.g., using the identifier appending component 212). In an exemplary embodiment, the identifier identifies a part of the temporal window in which the feature identified by the descriptor is located.

At 720, method 700 can include computing the counts of the quantized descriptors that are augmented with the identifier (e.g., using the counting component 214). The count can be computed over the temporal window.

Turning to FIG. 7C, at 722, method 700 can include generating a weighted set of augmented quantized descriptors in which the weights are the counts computed at 720. In some embodiments, the counts can be adjusted by multiplying one or more of the counts by a function of a scale descriptor to weigh the descriptors with larger spatial support heavier than descriptors with less spatial support. The weighted set can be represented as a histogram. For example, the histogram/weighted representation generation component 216 may generate an unnormalized histogram to represent the weighted set. The weighted set may also be represented as a sparse vector. For example, the histogram/weighted representation generation component 216 may generate a sparse vector, where the index is the augmented descriptor, to represent the weighted set.

At 724, in embodiments wherein the histogram is computed, the method 700 can include computing one or more hash values for the histogram (e.g., using the hash generation component 218). By way of example, but not limitation, a weighted minhash can be employed since the probability of collision can approximately equal the Jaccard similarity of histogram. Minhash (min-wise independent permutations locality sensitive hashing) is a technique for quickly estimating the similarity between two sets. One weighted minhash that can be employed, Weighted Minhash, generalizes the min-wise permutation hashes of Broder (see e.g., Broder et al., "Min-wise independent permutations," J. Comput. Syst. Sci., vol. 60, no. 3, pp. 630-659, 2000) from binary to real weights. (See Sergey Ioffe, "Improved Consistent Sampling, Weighted Minhash and L1 Sketching," IEEE ICDM, 2010.)

At 726, method 700 can include computing the SFP based on the one or more hash values (e.g., using the SFP generation component 210). In various embodiments, the methods and systems described in this disclosure can utilize wavelets for generation of the SFPs.

Figure 8:
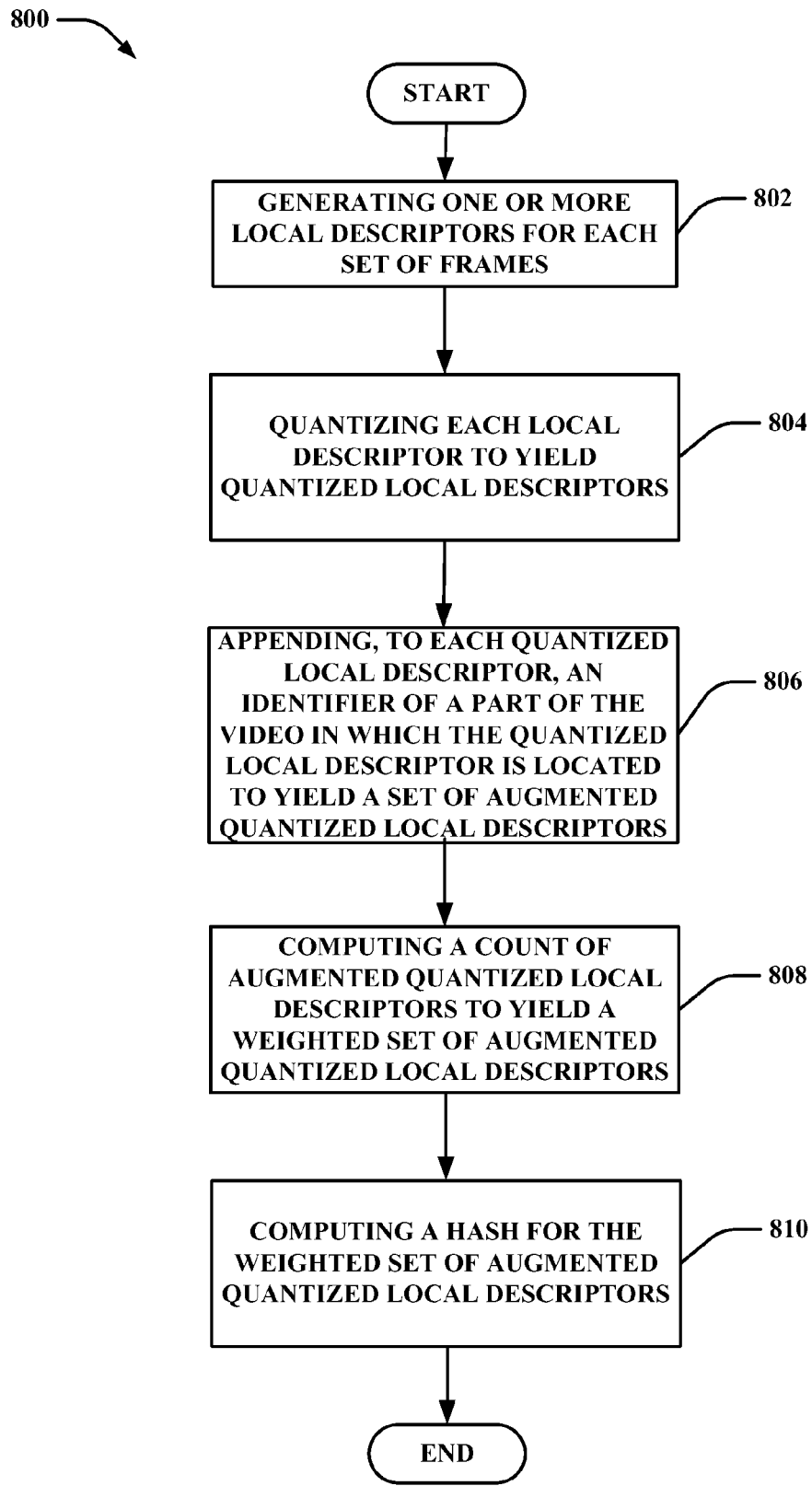

FIG. 8 is an exemplary flow diagram that illustrates a method for generating an SFP of a snippet of a video, wherein the snippet includes sets of frames.

At 802, method 800 can include generating one or more local descriptors for each set of frames (e.g., using the feature extraction component 200). In some embodiments, generating the one or more local descriptors can include averaging two or more frames to yield an average of the two or more frames, and generating one or more local descriptors for the average.

At 804, method 800 can include quantizing each local descriptor to yield quantized local descriptors (e.g., using the quantization component 202). In various embodiments, quantizing the local descriptor can include quantizing a local descriptor using tree-based quantization.

In some embodiments, quantizing the local descriptor can include quantizing a position of a local descriptor using two or more grids to generate a quantized position value. A tuple of quantization values can be created for the local descriptor. In some embodiments, the tuple can include the quantized position value. The tuple may also be a type, quantized scale and/or quantized descriptor.

At 806, method 800 can include appending, to each quantized local descriptor, an identifier of a part of a snippet in which the quantized local descriptor is located to yield a set of augmented quantized local descriptors (e.g., using the identifier appending component 212). For example, if each SFP is calculated for three seconds of video, an identifier can be appended specifying whether the quantized local descriptor occurred in the first half of the three seconds or the second half of the three seconds.

In various embodiments, each frame or frame average can be associated with one or more snippets (e.g., if the SFPs are computed every 0.25 seconds, for example). As such, the same local descriptor can be augmented differently for different snippets. In various embodiments, 806 of method 800 is optional and is not included in method 800.

At 808, method 800 can include computing a count of augmented quantized local descriptors to yield a weighted set of augmented quantized local descriptors (e.g., using the counting component 214).

At 810, method 800 can include computing a hash for the weighted set of augmented quantized local descriptors (e.g., using the hash generation component 218). In some embodiments, the hash can be computed using a weighted minhash.

Although not shown, in some embodiments, the method can include convolving the video with a temporal filter prior to generating the one or more local descriptors. In various embodiments, although also not shown, method 800 can also include removing data (e.g., a border or logo) from the video prior to generating the one or more local descriptors.

Exemplary Networked and Distributed Environments

One of ordinary skill in the art can appreciate that the various embodiments described in this disclosure can be implemented in connection with any computer or other client or server device, which can be deployed as part of a computer network or in a distributed computing environment, and can be connected to any kind of data store where media may be found. In this regard, the various embodiments described in this disclosure can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 9:
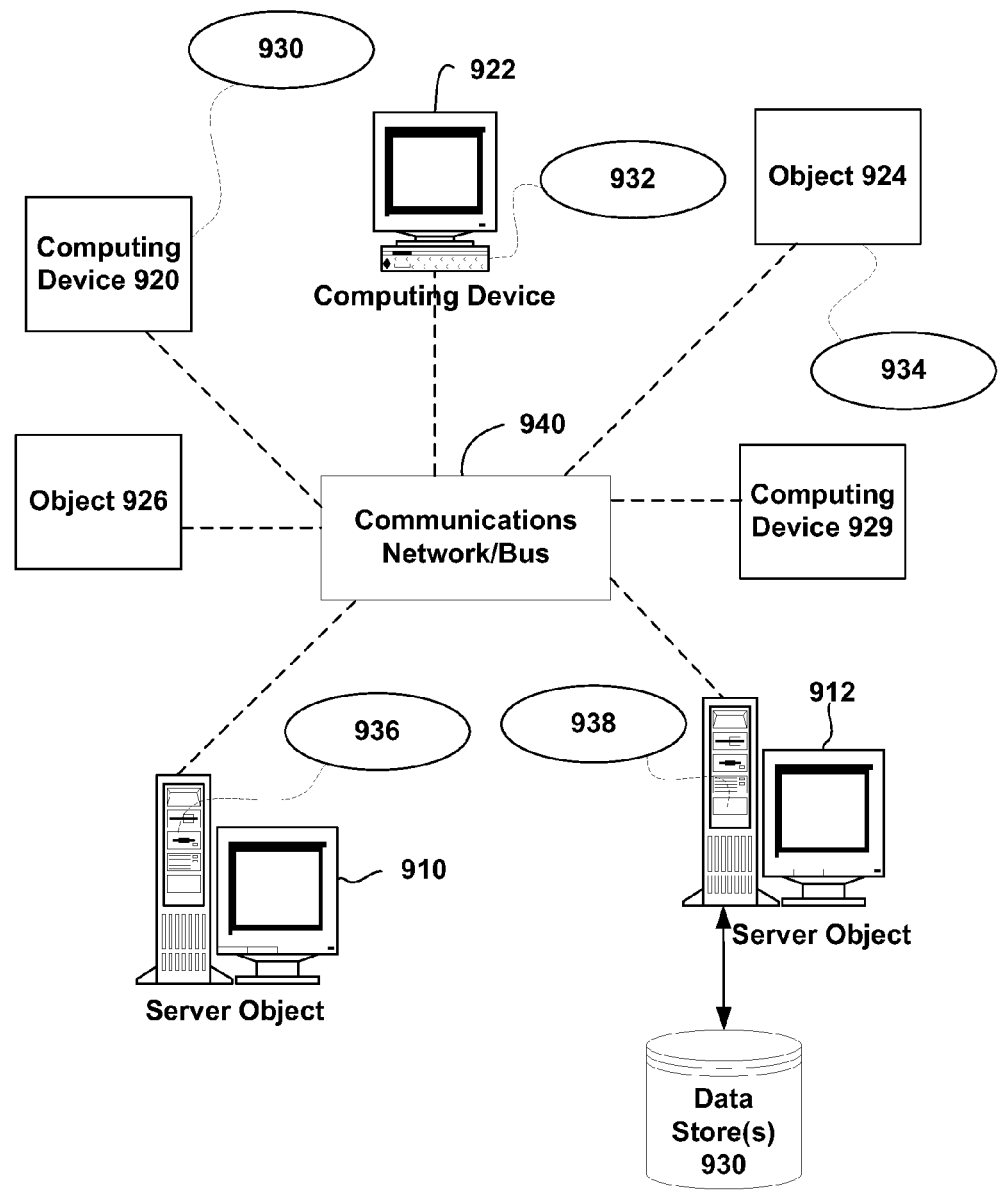
FIG. 9 is an illustration of a schematic diagram of an exemplary networked or distributed computing environment for implementing one or more embodiments described in this disclosure.

FIG. 9 provides a schematic diagram of an exemplary networked or distributed computing environment in which embodiments described in this disclosure can be implemented. The distributed computing environment includes computing objects 910, 912, etc. and computing objects or devices 920, 922, 924, 926, 928, etc., which can include programs, methods, data stores, programmable logic, etc., as represented by applications 930, 932, 934, 936, 938. It can be appreciated that computing objects 910, 912, etc. and computing objects or devices 920, 922, 924, 926, 928, etc. can include different devices, such as personal digital assistants (PDAs), audio/video devices, mobile phones, MPEG-1 Audio Layer 3 (MP3) players, personal computers, laptops, tablets, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, network 940 can include other computing objects and computing devices that provide services to the system of FIG. 9, and/or can represent multiple interconnected networks, which are not shown. Each computing object 910, 912, etc. or computing objects or devices 920, 922, 924, 926, 928, etc. can also contain an application, such as applications 930, 932, 934, 936, 938, that might make use of an application programming interface (API), or other object, software, firmware and/or hardware, suitable for communication with or implementation of the various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "module," "system," and the like are intended to refer to a computer-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In a client/server architecture, particularly a networked system, a client can be a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc. provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances. Any of these computing devices can process data, or request transaction services or tasks that can implicate the techniques for systems as described in this disclosure for one or more embodiments.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described in this disclosure can be provided standalone, or distributed across multiple computing devices or objects.

In a network environment in which the communications network/bus 940 can be the Internet, for example, the computing objects 910, 912, etc. can be Web servers, file servers, media servers, etc. with which the client computing objects or devices 920, 922, 924, 926, 928, etc. communicate via any of a number of known protocols, such as the hypertext transfer protocol (HTTP). Objects 910, 912, etc. can also serve as client computing objects or devices 920, 922, 924, 926, 928, etc., as can be characteristic of a distributed computing environment.

Exemplary Computing Device

Figure 10:
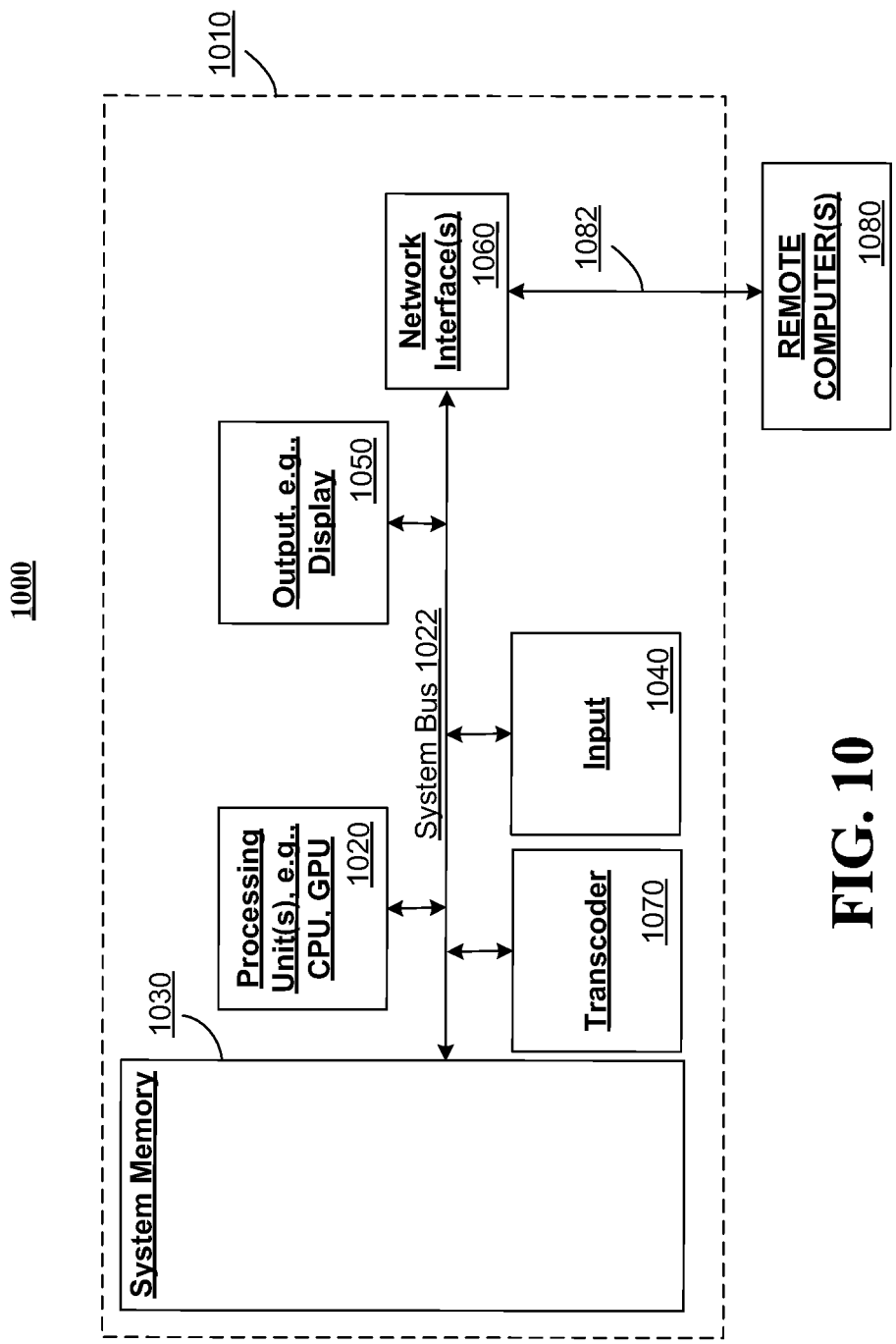
FIG. 10 is an illustration of a schematic diagram of an exemplary computing environment for implementing one or more embodiments described in this disclosure.

As mentioned, advantageously, the techniques described in this disclosure can be applied to any suitable device. It is to be understood, therefore, that handheld, portable and other computing devices and computing objects of all kinds are contemplated for use in connection with the various embodiments, i.e., anywhere that a device may wish to read or write transactions from or to a data store. Accordingly, the below remote computer described below in FIG. 10 is but one example of a computing device. Additionally, a suitable server can include one or more aspects of the below computer, such as a media server or other media management server components.

Although not required, embodiments can be partly implemented via an operating system, for use by a developer of services for a device or object, and/or included within application software that operates to perform one or more functional aspects of the various embodiments described in this disclosure. Software can be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 10 thus illustrates an example of a suitable computing system environment 1000 in which one or aspects of the embodiments described in this disclosure can be implemented, although as made clear above, the computing system environment 1000 is only one example of a suitable computing environment and is not intended to suggest any limitation as to scope of use or functionality. Neither is the computing environment 1000 to be interpreted as having any dependency or requirement relating to any one or combination of components illustrated in the exemplary computing environment 1000.

With reference to FIG. 10, an exemplary computing environment 1000 for implementing one or more embodiments includes a computing device in the form of a computer 1010 is provided. Components of computer 1010 can include, but are not limited to, a processing unit 1020, a system memory 1030, and a system bus 1022 that couples various system components including the system memory to the processing unit 1020.

Computer 1010 typically includes a variety of computer readable media and can be any available media that can be accessed by computer 1010. The system memory 1030 can include computer storage media in the form of volatile and/or nonvolatile memory such as read only memory (ROM) and/or random access memory (RAM). By way of example, and not limitation, memory 1030 can also include an operating system, application programs, other program modules, and program data.

Computer 1010 can also include a transcoder 1070. Transcoder 1070 can perform encoding. In some embodiments, the transcoder 1070 can convert data encoded in a first format to data encoded in a second format. In various embodiments, transcoder 1070 can also perform decoding.

A user can enter commands and information into the computer 1010 through input devices 1040, non-limiting examples of which can include a keyboard, keypad, a pointing device, a mouse, stylus, touchpad, touch screen, trackball, motion detector, camera, microphone, joystick, game pad, scanner, video camera or any other device that allows the user to interact with the computer 1010. A monitor or other type of display device can be also connected to the system bus 1022 via an interface, such as output interface 1050. In addition to a monitor, computers can also include other peripheral output devices such as speakers and a printer, which can be connected through output interface 1050.

The computer 1010 can operate in a networked or distributed environment using logical connections to one or more other remote computers, such as remote computer 1080. The remote computer 1080 can be a personal computer, a server, a router, a network PC, a peer device or other common network node, or any other remote media consumption or transmission device, and can include any or all of the elements described above relative to the computer 1010. The logical connections depicted in FIG. 10 include a network 1082, such local area network (LAN) or a wide area network (WAN), but can also include other networks/buses e.g., cellular networks.

As mentioned above, while exemplary embodiments have been described in connection with various computing devices and network architectures, the underlying concepts can be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques detailed herein. Thus, embodiments herein are contemplated from the standpoint of an API (or other software object), as well as from a software or hardware object that implements one or more aspects described in this disclosure. Thus, various embodiments described in this disclosure can have aspects that are wholly in hardware, partly in hardware and partly in software, as well as in software.

Computing devices typically include a variety of media, which can include computer-readable storage media and/or communications media, in which these two terms are used herein differently from one another as follows. Computer-readable storage media can be any available storage media that can be accessed by the computer, can be typically of a non-transitory nature, and can include both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, electrically erasable programmable read only memory (EEPROM), flash memory or other memory technology, compact disc read only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

It is to be understood that the embodiments described in this disclosure can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described in this disclosure, or a combination thereof.

When the embodiments are implemented in software, firmware, middleware or microcode, program code or code segments, they can be stored in a machine-readable medium (or a computer-readable storage medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described in this disclosure can be implemented with modules or components (e.g., procedures, functions, and so on) that perform the functions described in this disclosure. The software codes can be stored in memory units and executed by processors. A memory unit can be implemented within the processor or external to the processor, in which case it can be communicatively coupled to the processor via various structures.

The word "exemplary" is used herein to mean serving as an example, instance, or illustration. For the avoidance of doubt, the subject matter disclosed herein is not limited by such examples. In addition, any aspect or design described in this disclosure as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Moreover, use of the term "an embodiment" or "one embodiment" throughout is not intended to mean the same embodiment unless specifically described as such. Further, use of the term "plurality" can mean two or more.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components can be combined into a single component providing aggregate functionality or divided into several separate sub-components, and that any one or more middle layers, such as a management layer, can be provided to communicatively couple to such sub-components in order to provide integrated functionality. Any components described in this disclosure can also interact with one or more other components not specifically described in this disclosure but generally known by those of skill in the art.

In view of the exemplary systems described above methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described in this disclosure. Where non-sequential, or branched, flow is illustrated via flowchart, it can be appreciated that various other branches, flow paths, and orders of the blocks, can be implemented which achieve the same or a similar result. Moreover, not all illustrated blocks can be required to implement the methodologies described in this disclosure after.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be provided across a plurality of devices. The invention is not to be limited to any single embodiment, but rather can be construed in breadth, spirit and scope in accordance with the appended claims.

What is claimed is:

1. A system comprising:
   a memory that stores computer executable components; and
   a microprocessor that executes the following computer executable components stored in the memory:
      a video fingerprinting component that generates a sub-fingerprint of a video, the video fingerprinting component comprising:
         a feature extraction component that determines one or more local descriptors for one or more selected frames of the video;
         a quantization component that quantizes the one or more local descriptors to generate first frame information, the first frame information comprising a set of values for the one or more selected frames of the video;
         an accumulation component that accumulates the first frame information over a snippet of the video, the snippet comprising selected consecutive ones of the frames of the video; and a subfingerprint generation component that computes the subfingerprint associated with the snippet, wherein the computing the subfingerprint comprises computing a first hash based on an accumulated first frame information over the snippet.

2. The system of claim 1, wherein the subfingerprint generation component is a component that also:

generates augmented quantized one or more local descriptors by appending, to quantized one or more local descriptors, an identifier of a part of the snippet in which the quantized one or more local descriptors occurred;

computes counts of the augmented quantized one or more local descriptors over the snippet;

generates a histogram comprising a weighted set of the augmented quantized one or more local descriptors; and computes the subfingerprint based, at least, on computing one or more hash values for the histogram.

3. The system of claim 1, wherein the one or more local descriptors include a local descriptor based on Gabor wavelets.

4. The system of claim 1, wherein the one or more local descriptors include at least one of a scale invariant feature transform (SIFT) descriptor or a Speeded Up Robust Feature (SURF) descriptor.

5. The system of claim 1, wherein the one or more local descriptors include at least one of a type, position, scale, aspect ratio or a descriptor of a portion of the one of the one or more selected frames.

6. The system of claim 1, wherein the one or more selected frames comprises two or more selected frames and the feature extraction component determines the one or more local descriptors for an average of the two or more selected frames.

7. A method, comprising:

employing a microprocessor to execute computer executable components stored within a memory to perform the following:

determining one or more local descriptors for at least one frame of a video;

quantizing the one or more local descriptors to generate first frame information, the first frame information comprising a set of values for the at least one frame;

accumulating additional first frame information over a snippet of the video, the snippet comprising the at least one frame and one or more additional frames of the video within a fixed duration of time; and computing a subfingerprint associated with the snippet, wherein the computing the subfingerprint comprises computing a first hash based on an accumulated first frame information over the snippet.

8. The method of claim 7, wherein determining one or more local descriptors for at least one frame of the video comprises:

determining one or more local descriptors for an average of two or more frames of the video.

9. The method of claim 7, wherein the snippet is separated a predefined amount of time apart from another snippet.

10. The method of claim 7, wherein the one or more local descriptors include a local descriptor based on Gabor wavelets.

11. The method of claim 7, wherein the one or more local descriptors include at least one of a scale invariant feature transform (SIFT) descriptor or a Speeded Up Robust Feature (SURF) descriptor.

12. The method of claim 7, wherein the one or more local descriptors include at least one of a type, position, scale, aspect ratio or a descriptor of a portion of the at least one frame.

13. The method of claim 7, wherein quantizing the one or more local descriptors comprises tree-based quantization of the one or more local descriptors.

14. The method of claim 13, wherein the tree-based quantization comprises a hierarchical k-means quantization.

15. The method of claim 7, wherein quantizing the one or more local descriptors comprises mapping the one or more local descriptors to one or more closest neighbors from a selected set of neighbors.

16. The method of claim 7, wherein computing the subfingerprint comprises:

generating augmented quantized one or more local descriptors by appending, to quantized one or more local descriptors, an identifier of a part of the snippet in which the quantized one or more local descriptors occurred;

computing counts of the augmented quantized one or more local descriptors over the snippet;

generating a histogram comprising a weighted set of the augmented quantized one or more local descriptors; and computing the subfingerprint based at least on computing one or more hash values for the histogram.

17. The method of claim 7, wherein the method further comprises:

removing selected content from the at least one frame prior to determining the one or more local descriptors.

18. The method of claim 17, wherein the selected content comprises a border.

19. The method of claim 17, wherein the selected content comprises a logo.

20. A method, comprising:

employing a microprocessor to execute computer executable components stored within a memory to perform the following:

generating a first set of one or more local descriptors for at least one frame of a video;

generating a second set of one or more local descriptors for a flipped version of the at least one frame of the video;

quantizing the local descriptors of the first set and the second set to generate quantized local descriptors;

appending, to each quantized local descriptor, an identifier of a part of a snippet of the video in which the quantized local descriptor is located to generate a set of augmented quantized local descriptors;

generating a histogram representing the set of augmented quantized local descriptors; and computing a subfingerprint for the video based at least on computing one or more hash values for the histogram.

21. The method of claim 20, wherein generating the first set of one or more local descriptors comprises:

generating one or more local descriptors for an average of two or more frames.

22. The method of claim 20, wherein the flipped version is a horizontally flipped version.

23. The method of claim 20, wherein the flipped version is a vertically flipped version.

24. A method for generating a subfingerprint of a snippet of a video, wherein the snippet comprises sets of frames, the method comprising:

generating one or more local descriptors for each set of frames;

quantizing each local descriptor to yield quantized local descriptors;

appending, to each quantized local descriptor, an identifier of a part of the snippet in which the quantized local descriptor is located to yield a set of augmented quantized local descriptors;

computing a count of augmented quantized local descriptors to yield a weighted set of augmented quantized local descriptors; and computing a hash for the weighted set of augmented quantized local descriptors.

25. The method of claim 24, further comprising:
convolving the video with a temporal filter prior to generating the one or more local descriptors.

26. The method of claim 24, further comprising:
removing a border from the video prior to generating the one or more local descriptors.

27. The method of claim 24, further comprising:
removing a logo from the video prior to generating the one or more local descriptors.

28. The method of claim 24, wherein generating the one or more local descriptors comprises:
averaging two or more frames to yield an average of the two or more frames;
generating one or more local descriptors for the average.

29. The method of claim 24, wherein quantizing each local descriptor comprises:
quantizing a local descriptor using tree-based quantization.

30. The method of claim 24, wherein quantizing each local descriptor comprises:
quantizing a position of a local descriptor using two or more grids to generate a quantized position value.

31. The method of claim 30, wherein quantizing each local descriptor further comprises:
creating a tuple of quantization values for the local descriptor, the tuple comprising the quantized position value.

32. The method of claim 30, wherein computing the hash comprises computing the hash using a weighted minhash.

* * * * *